April 15, 1924.                    1,490,173
KALMAN V. KANDO
BEARING OF THE ROTORS OF ELECTRIC MACHINES
Filed Sept. 17, 1920    2 Sheets-Sheet 1

Inventor:
Kalman von Kando
by Emery, Booth, Janney + Varney
Attys.

April 15, 1924.  
KALMAN V. KANDO  
BEARING OF THE ROTORS OF ELECTRIC MACHINES  
Filed Sept. 17, 1920    2 Sheets-Sheet 2
1,490,173
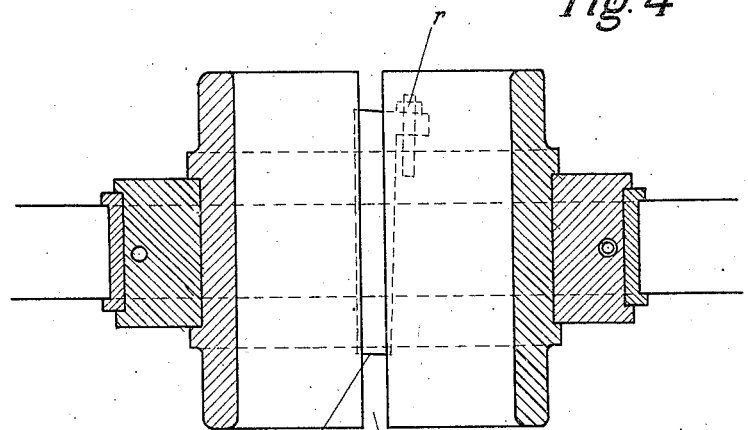
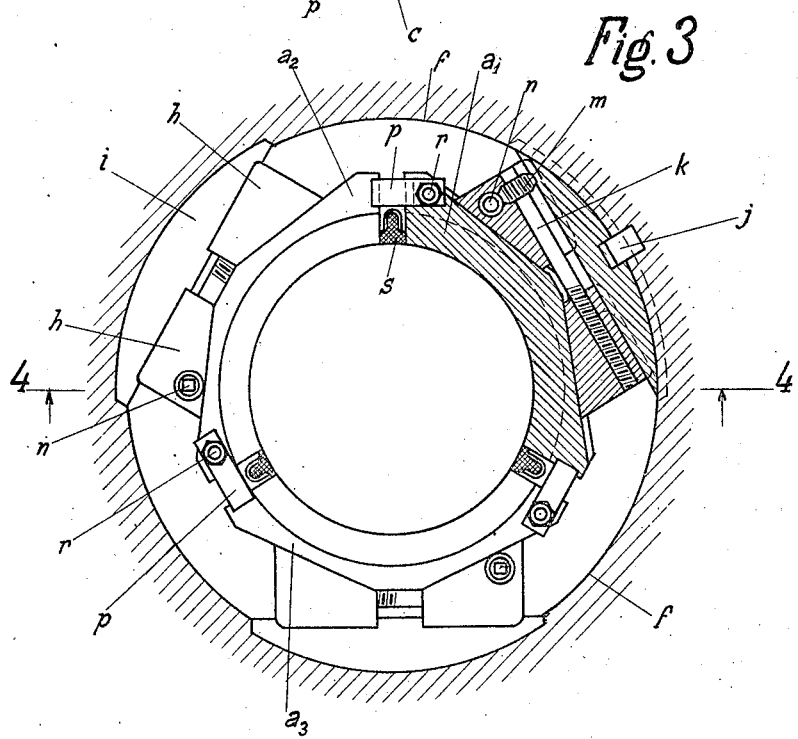
Inventor:  
Kalman von Kando,  
by Emery, Booth, Janney & Varney  
Attys.

Patented Apr. 15, 1924.

1,490,173

UNITED STATES PATENT OFFICE.

KALMAN v. KANDO, OF BUDAPEST, HUNGARY.

BEARING OF THE ROTORS OF ELECTRIC MACHINES.

Application filed September 17, 1920. Serial No. 411,015.

*To all whom it may concern:*

Be it known that I, KALMAN VON KANDO, engineer, a citizen of Hungary, residing at Budapest, in the Kingdom of Hungary, have invented certain new and useful Improvements in the Bearings of the Rotors of Electric Machines, of which the following is a specification.

My invention relates to improvements in rotor bearings of electric machines of the enclosed type and more especially of such machines having a very small air-gap.

In various types of electric machines especially in the motors of electric locomotives the bearings are submitted to very heavy strains by which the bearings wear out very soon, thus requiring frequent adjusting or changing of the brasses. In machines having very small air-gaps, such as induction motors, the adjusting of the brasses has to be done with a very high precision, to ensure the necessary evenness of the air-gap throughout the whole periphery of the rotor. Such a minute adjusting is however rendered very difficult and often quite impossible with machines of the enclosed type or with motors built into the frame of locomotives.

According to my invention these drawbacks are eliminated, allowing the removal and change or the adjustment of the bushings or brasses of machines of the enclosed type with the utmost precision without the necessity of dismantling, an advantage of great value especially in electric locomotives.

In the annexed drawings I have shown as an example two modifications of my invention.

Fig. 3 is another modification of the bearing in front elevation, partly in section and Fig. 4 is a longitudinal sectional elevation according to line 4—4 of Fig. 3.

Figure 1:
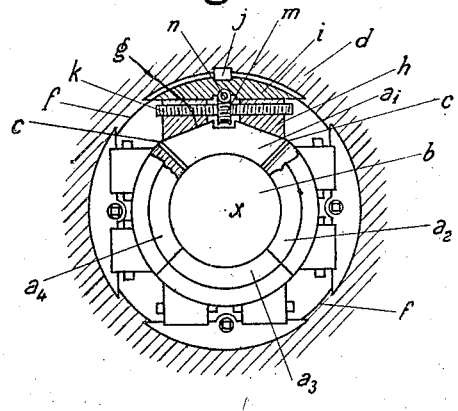
Fig. 1 is a front elevation, partly in section of a bearing according to my invention.

With reference to Fig. 1, the bushings or brasses are split according to two planes perpendicular to each other, forming thereby four brass-segments $a_1$—$a_4$. The brass-segments are provided at their joints with projections, forming thereby slots —$c$— between two adjacent brass-segments extending to the journal —$b$—. It may be further understood, that the slots extending through the brasses to the journal must not be located between the brass-segments, but may be formed within these segments, at any accessible point of these latter.

Figure 2:
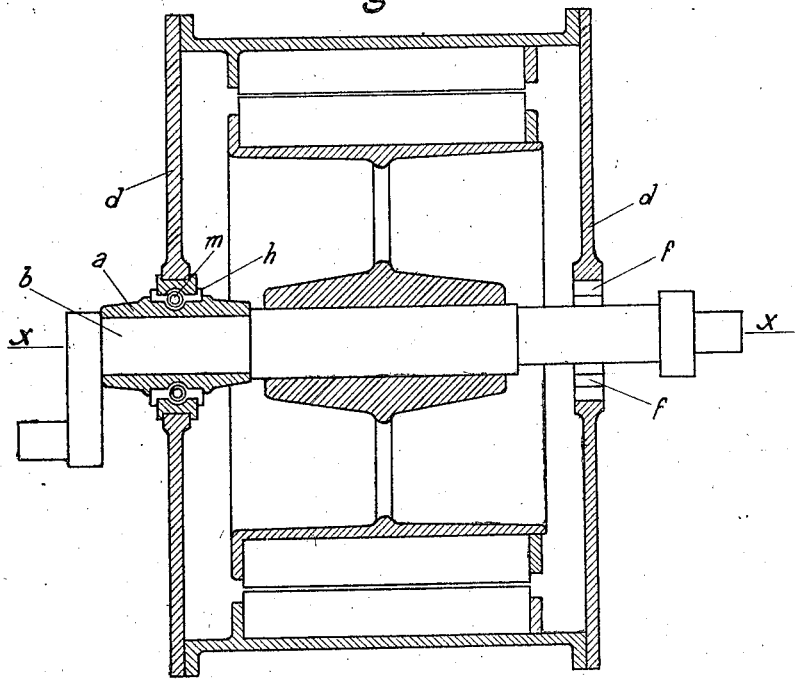
Fig. 2 is a longitudinal sectional elevation; the bearing on the right hand side of the machine being removed.

Opposite to the said slots —$c$— I provide on the shell —$d$— of the stator (Fig. 2) at least two externally accessible distance-surfaces —$f$— located in two different radial directions (suitably perpendicular to each other) with respect to and in the same radial distance from the axis $x$—$x$ of the journal —$b$—. In Fig. 1 I have shown four distance-surfaces —$f$— in respective angular distances of 90°, each slot —$c$— having an opposite distance surface —$f$—.

The bushings or brass-segments are provided with any suitable adjusting device.

According to Fig. 1, —$i$— are shoes located opposite to each brass-segment respectively and —$j$— are keys to secure said shoes in place. —$g$— are sloping bearing-surfaces on the outer face of the brass-segments and —$h$— are two opposed wedges inserted between the shoe —$i$— and the bearing surfaces —$g$—. —$k$— are right- and left-handed twin-screw-bolts coupling the two wedges —$h$, $h$— acting on one brass-segment. —$m$— is a worm-wheel located between the two wedges coupled by said twin-screw-bolt —$k$— and secured thereto. —$n$— is a worm, parallel with the journal —$b$— and meshing with the worm wheel $m$, said worm being prevented from moving in its axial direction.

All four brass-segments are provided with like adjusting-devices.

To adjust the brasses, the worms —$n$— belonging to the respective brass-segments are rotated by means of suitable wrenches. The worm —$n$— rotates the worm wheel —$m$— together with the twin-screw —$k$—, thereby drawing together or separating from each other the two coupled wedges —$h$— according to the direction of rotation of the worm. If the wedges —$h$— are drawn together, the respective brass-segment will be pressed, by means of the beveled faces —$g$, $g$,— against the journal, and if the wedges —h, h— are removed from each other, the brass-segment is permitted to withdraw from the journal.

The distance of the periphery of the journal from the distance-surfaces —f, f— can be measured through the slots —c— in four different directions, spaced 90° apart. The brasses are properly adjusted as long, as the distances measured in the four slots —c— remain equal. In this way an even breadth of the air-gap may be insured throughout the whole periphery of the rotor, without dismantling of the machine.

If by rotating the worms —n— the wedges —h, h— are moved far enough from each other, the brass-segments may be removed and changed without dismantling of the machine.

The worm and worm-gear for adjusting the brass-segments act as locking devices to keep the brasses in their respective position.

According to the modification shown in Fig. 3, I provide instead of the twin-screws for controlling the wedges adjusting the brass-segments, single screw-bolts —k— engaging with their threaded part one of the two wedges, while the worm —n— is journalled in the other wedge. The worm wheel —m— meshing with said worm is secured to and near the end of the screw-bolt —k—.

According to Fig. 3 the bushing of the bearing is split into three segments instead of four, as shown in Fig. 1 and the slots are spaced 120° apart. A further improvement shown in Fig. 3 and 4 are the wedges —p— inserted between the adjacent faces of the brass-segments. —r— is a screw for securing the wedges —p— to the brass-segments. Said wedges are for securing the brass-segments in their relative positions even though the bearing is worn out to such a degree, that the journal would not hold the brasses in their proper positions.

I have shown further strips s of elastic and oil-proof material, such as felt, filling the space between the adjacent brass-segments and preventing the lubricant from flowing out.

It should be understood, that I do not limit my invention to the construction shown as an example in the drawing. For obviously the distance surfaces f may be of a greater or smaller breadth, and may be reduced to mere ribs or edges. They may be formed integral with the front plates of the stator-shell, or may be inserted as separate hardened pieces. It may be further understood, that the slots extending through the brasses to the journal need not be located between the brass-segments, but may be formed within these segments at any accessible point thereof.

Although it is preferable to dispose the distance faces in equal distances from the journal, they may be located in different distances this difference must however be taken into consideration when adjustments are made.

What I claim is:

1. In an electric machine, a rotor, a stator, a shell, bearings in said shell supporting the journals of the rotor, segments forming the bushings or brasses in said bearings, means to radially adjust each of said segments, externally accessible slots extending radially through said bushings or brasses to the journals and relatively fixed externally accessible distance-surfaces in connection with the stator-shell opposite to the said slots.

2. In an electric machine, a rotor, a stator, a shell, bearings in said shell supporting the journals of the rotor, segments forming the bushings or brasses in said bearings, beveled bearing surfaces on the outer face of the brass-segments, pairs of wedges inserted between the said bearing surfaces of the brass-segment and the stator-shell, a screw-bolt engaging said wedges, a worm-wheel on said screw-bolt between said wedges and a worm engaging said worm-wheel, externally accessible slots extending radially through said bushings or brasses to the journals and externally accessible distance-surfaces in connection with the stator-shell opposite to the said slots.

3. In an electric machine, a rotor, a stator, a shell, bearings in said shell supporting the journals of the rotor, segments forming the bushings or brasses in said bearings, beveled bearing surfaces on the outer face of the brass segments, pairs of wedges inserted between the said bearing surfaces of the brass-segments and the stator-shell, a screw-bolt engaging one of the said wedges, a worm-wheel on said screw-bolt between said wedges and a worm journalled in the other wedge and engaging said worm wheel, externally accessible slots extending radially through said bushings or brasses to the journals and externally accessible distance-surfaces in connection with the stator-shell opposite to the said slots.

4. In an electric machine, a rotor, a stator, a shell, bearings in said shell supporting the journals of the rotor, segments forming the bushings in said bearings, beveled bearing surfaces on the outer face of the said segments, shoes secured to the stator-shell, pairs of wedges inserted between the said bearing surfaces of the said segments and the said shoes and means to alter the relative distance of said wedges, externally accessible slots extending radially through said bushings to the journals and externally accessible distance-surfaces in connection with the stator-shell opposite to the said slots.

5. In an electric machine, a rotor, a stator, a shell, bearings in said shell supporting the journals of the rotor, segments forming the bushings in said bearings, beveled bearing surfaces on the outer face of the segments, shoes secured to the stator-shell, pairs of wedges inserted between the said bearing surfaces of each segment and the said shoes, a screw-bolt engaging said wedges, a worm wheel on said screw-bolt between said wedges and a worm engaging said worm wheel and operable from the end of said bearing.

6. In an electric machine, a rotor, a stator, a shell, bearings in said shell supporting the journals of the rotor, segments forming the bushings in said bearings, beveled bearing surfaces on the outer face of the segments, shoes secured to the stator-shell, pairs of opposed wedges inserted between the said bearing surfaces of each segment and the said shoes, a screw-bolt engaging both of the wedges of each pair, a worm wheel on said screw-bolt between said wedges and a worm journalled in the other wedge and engaging said worm wheel, externally accessible slots extending radially through said bushings to the journals and externally accessible distance-surfaces in connection with the stator-shell opposite to the said slots.

7. In an electric machine, a rotor, a stator, a shell, bearings in said shell supporting the journals of the rotor, segments forming the bushings in said bearings, externally accessible means to radially adjust said segments, means to keep apart the said segments at their joint to form slots extending radially through said bushings to the journals, and strips of felt filling said slots.

8. In an electric machine, a rotor, a stator, a shell, bearings in said shell supporting the journals of the rotor, segments forming the bushings in said bearings, externally accessible means to radially adjust said segments, opposed wedges adjustable transversely to the axis of said journal and inserted between the joint faces of the said segments keeping them apart to form slots extending radially through said bushings to the journals and externally accessible distance surfaces in connection with the stator-shell opposite to the said slots.

9. In an electric machine, a rotor, a stator, a shell, bearings in said shell supporting the journals of the rotor, segments forming the bushings in said bearings, externally accessible means to radially adjust said segments, opposed wedges inserted between the joint faces of the said segments keeping them apart to form slots extending radially through said bushes or brasses to the journals, strips of an elastic and oil-proof material filling said slots and externally accessible distance surfaces in connection with the stator-shell opposite to the said slots.

10. In a bearing, a series of segments constituting a bushing for said bearing, a pair of opposed adjustable wedges engaging each of said segments to effect independent lateral adjustment of said segments, a right and left threaded screw bolt for each pair of wedges and worm and worm gear means arranged between the wedges of each pair independently to move said wedges toward and from each other.

In testimony whereof I affix my signature in presence of two witnesses.

KALMAN v. KANDO.

Witnesses:
S. B. VAUGHAN,
EUG. KAVRANN.